United States Patent [19]

Ackeret

[11] Patent Number: 4,875,584

[45] Date of Patent: Oct. 24, 1989

[54] CONTAINER FOR MAGNETIC TAPE CASSETTES

[75] Inventor: Peter Ackeret, Kusnacht, Switzerland

[73] Assignee: IDN Inventions and Development of Novelties AG, Chur, Switzerland

[21] Appl. No.: 287,874

[22] Filed: Dec. 21, 1988

[30] Foreign Application Priority Data

Dec. 22, 1987 [DE] Fed. Rep. of Germany ....... 3743481

[51] Int. Cl.[4] .............................................. B65D 85/672
[52] U.S. Cl. .................................. 206/387; 312/319; 312/333
[58] Field of Search ........................... 206/387, 45.13; 312/8–19, 319, 333

[56]     References Cited
         U.S. PATENT DOCUMENTS

4,493,417  1/1985  Ackeret .............................. 206/387
4,632,248  12/1986 Hsu ..................................... 206/387
4,640,415  2/1987  Ackeret .............................. 206/387
4,655,344  4/1987  Ackeret .............................. 206/387
4,664,261  5/1987  Trodeus ............................. 206/387
4,678,081  7/1987  Richter .............................. 206/387
4,702,372  10/1987 Ackeret .............................. 206/387
4,738,361  4/1988  Ackeret .............................. 206/387
4,743,077  5/1988  Bohnet et al. ...................... 206/387
4,760,502  7/1988  Ackeret .............................. 206/387
4,778,228  10/1988 Ackeret .............................. 206/387

Primary Examiner—Joseph Man-Fu Moy
Attorney, Agent, or Firm—Chilton, Alix & Van Kirk

[57]                ABSTRACT

A container for a DAT (Digital Audio Tape) cassette includes a housing and a slider which transports a cassette from a storage position into a removal position. The slider carries a bracket provided with cams resiliently engaging a cassette recess so to secure the cassette on the slider even in the ejected position of the latter.

15 Claims, 12 Drawing Sheets

CONTAINER FOR MAGNETIC TAPE CASSETTES

The present invention relates to a container for magnetic tape cassettes. Prior art containers for such cassettes comprise a housing whichis open at a narrow side thereof and a transporter for displacing a cassette received in the housing between an inner storage position and an outer removal position. When so displaced, the cassette protrudes beyond the housing opening sufficiently to permit its grapsing by the user.

The container of the present invention is primarily provided for storage of so-called DAT-cassettes (Digital Audio Tape); the design, shape, and dimensions of such DAT-cassettes have meanwhile become internationally standardized. The basic shape is that of a brick, i.e. the cassette has to opposite and parallel large faces, two opposite and parallel longer narrow faces, and two opposite and parallel shorter narrow faces. One of the large faces has two circular depressions or recesses, disposed symmetrically with respect to a plane of symmetry extending parallel to the shorter narrow faces. The recesses are somewhat offset, however, with respect to the plane which extends centrally through the cassette and parallel to the two longer narrow faces; this (virtual) plane intersects the recesses so as to divide them into a smaller and a larger segment.

A cassette container wherein the transporter is a slider is disclosed in U.S. patent specification No. 4,778,228 and Japanese patent application No. 5977/83, respectively. The stroke of the slider between its inner and outer end positions is rather small because, in the removal position, a slider front wall is pivotallydisplaced sufficiently to permit grasping of the cassette which may be withdrawn in a direction coincident with its longitudinal extension.

It is an object of the present invention to provide a DAT-cassette container wherein an inserted cassette is positioned with respect to the transporter.

It is a further object of the present invention to provide a DATcassette container wherein an inserted cassette is secured against falling-off when it is presented for removal; this is important for use in a car where the orientation of the container is not necessarily horizontal and the use of the container must not necessitate much attention.

According to the invention, the container comprises a substantially brick-shaped housing open at a narrow side, and a transporter in the housing for displacing an inserted DAT-cassette from an inner storage position to an outer removal position. further, the conainer includes at least one arresting member which engages into one of the DAT-cassette recesses and which is delfectable in a direction transverse to the large faces of the cassette upon insertion or withdrawal of the latter.

The arresting member or members safely holds or hold an inserted cassette so that the latter will not tend to vibrate when used in a car, and will prevent premature ejection of a cassette when being transported into its removal position.

Cassette containers have been disclosed in the following U.S. patent specifications:

| | | | |
|---|---|---|---|
| 3,899,229 | 3,995,737 | 3,995,921 | 3,994,551 |
| 3,994,550 | 3,836,222 | 3,926,310 | 3,677,396 |
| 4,030,601 | 4,046,255 | 4,113,091 | 4,428,480 |
| 4,592,600 | 4,655,344 | 4,705,166 | 4,702,372 |

Pending U.S. patent application Ser. No. 092,434 filed Sept. 3, 1987 also relates to a cassette container.

Other objects and advantages of the invention will become apparent from the following description of preferred embodiments illustrated in the accompanying drawings wherein.

At first, the embodiment illustrated in FIG. 1, 2 and 3 will be described.

The container comprises a plastic housing which is substantially brick-shaped or cuboid; its top side and bottom side may be provided with complementary elements, as keys and grooves, so as to permit stacking of a plurality of containers, as described in the aforementioned U.S. Pat. No. 3,899,229.

The housing bottom has two parallel longitudinal grooves or slots 12. A transporter is designed as a slider 14 which is guided in the housing so as to be slidably moveable between an inner end position and an outer end position. The slider includes a guide portion 16 and a front wall assembly 18 which is pivotally connected to the guide portion by means of a hinge 20. Hinge 20 is disposed in the plane of the bottom 22 of guide portion 16 and the front wall assembly bottom 24. Guide portion 16 has hooks projecting from its bottom 22 into the grooves or slots 12 of the housing bottom so as to form stop means which define the outer end position of the slider when the hooks engage the outer slot end. A pressure spring 29 is inserted between housing rear wall 28 and guide portion rear wall 30. The spring produces a bias tending to eject the slider into tis outer end position. When the slider is pushed into the housing against the spring bias, the slider is locked by means of a lock member 32 which engages into a recess 34 in a housing side wall 36. The slider may be manaully unlocked upon actuation of a key or button 37. The key-and-lock member mechanism is housing in a cavity of front wall 40; details of such a system may be derived form U.S. patent specification No. 4,655,344 mentioned above. A sensor arm 42 senses the occupation status of the container so as to actuate a respective display (not shown); such systems may be derived from U.S. patent specification No. 4,592,600 mentioned above.

Guide portion bottom 22 is stiffened by ribs 43 extending to the housing bottom, and front wall bottom 24 has similar stiffening ribs.

Guiding and stiffening ribs 46 extend also outwards from guide portion side walls 44. In this manner, hollow spaces or cavities are defined, and one of the cavities accomodates a spring system which biases the front wall assembly into its displaced position illustrated in FIG. 1 so as to permit grasping and withdrawing of an inserted cassette 48. The spring system includes a coil spring with end arms. The spring 50 sits with its coil on a pin 52 integrally formed with the slider guide portion 16. One spring arm engages a stop 54 on the guide portion while the other spring arm engages behind a hook 56 provided on the under side of the front wall assembly. The displaced or pivoted-away position of the front wall assembly is defined by stops 60 on the guide portion side walls 44, the stops being respectively engaged by arms 62 extending from the front wall assembly rearwards beyond the hinge. Upon overload, the arms and/or the stops yield so that damages due to mishandling are avoided.

Pin 52 has an outer shoulder 53 which prevents falling-off of the spring coil. The shoulder extends about 180° of the pin circumference so that arm 62 may pass the pin without interfering with the shoulder.

An inserted cassette 48 is positioned laterally by the side walls 44. It is supported on guide portion bottom 22, and from above, the cassette is positioned by means of ribs 47 integrally formed with the top wall 45 of the housing.

The side walls 44 of the slider guide portion are chamfered at 64 and 66 so as to exhibit a funnell-shape to facilitaty insertion of a cassette.

The container described so far is ready for use. However, in accordance with the invnetion, it is improved to facilitate its handling.

Without the means provided by the invention, the user is compelled to brake the slider after actuation of the release key 37 because otherwise, the cassette could be catapulted out of the slider upon the latter having reached its outer end position. Further, although the storage position of the cassette is defined by the slider rear wall, a cassette supported by an ejected slider could be displaced outwards, for example due to vibrations in a moving car. If under such circumstances the user tries to re-displace the front wall assembly in order to store the cassette, the front wall would collide with the cassette. Either failure would be very dangerous in a moving car because it would necessarily attract the driver's attention.

According to the invention, the cassette is arrested in the container, and this is possible in each orientation of the DAT-cassette for which the container is provided.

The drawings illustrate the circular depressions or recesses 70 of the DAT-cassette, slightly offset with respect to the central plane 72, as defined above. FIG. 2 shows that the projections of the recesses in the plane of the large cassette faces overlap about an angular range of about 60°. Arresting cams 74 extend into this overlapping range from the top and bottom sides of the slider. The cams are provided at free ends 76 of a sheet metal bracket 78, preferably by chipless deformation. The bracket is of elastic spring material and snap-fitted fraom the rear unto rear wall 30 of the slider guide portion. During the snapping operation, latch tongues 80 are deflected and return into there initial position after having passed the rear wall so that the latches secure bracket 78 to the slider. The free ends of bracket arms 76 are slightly bent outwards so to prevent collision with a cassette upon its being isnerted. The top-side arm extends between the housing ribs 47. The bottom-side arm extends into a recess 82 of the guide portion bottom 22.

Figures 1, 3:
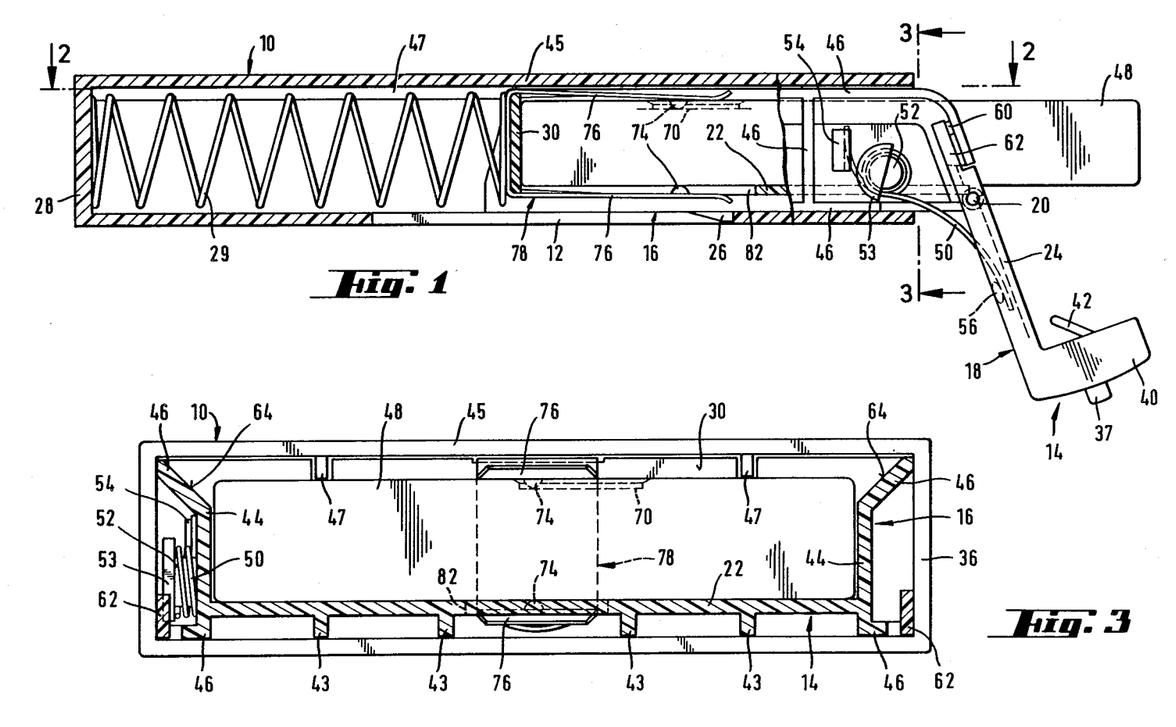
FIG. 1 is a longitudinal section view of an opened container according to the invention.
FIG. 3 shows a section view according to 3-3 in FIG. 2.

FIG. 1 shows the cassette 48 inserted with an orientatio such that its inner recess 70 is upside and therefore engaged bythe upper arresting cam 74 which, for this reason, cannot be seen in FIG. 1. The bottom-side can 74 resiliently engages the adjacent large face of the cassette. It will be recognized, however, that the cassette may be inserted and arrested in each of the possible four orientations.

For removal, a slight pulling force exerted ont ehcassette will lift the arresting cam 74 from recess 70.

Figure 4:
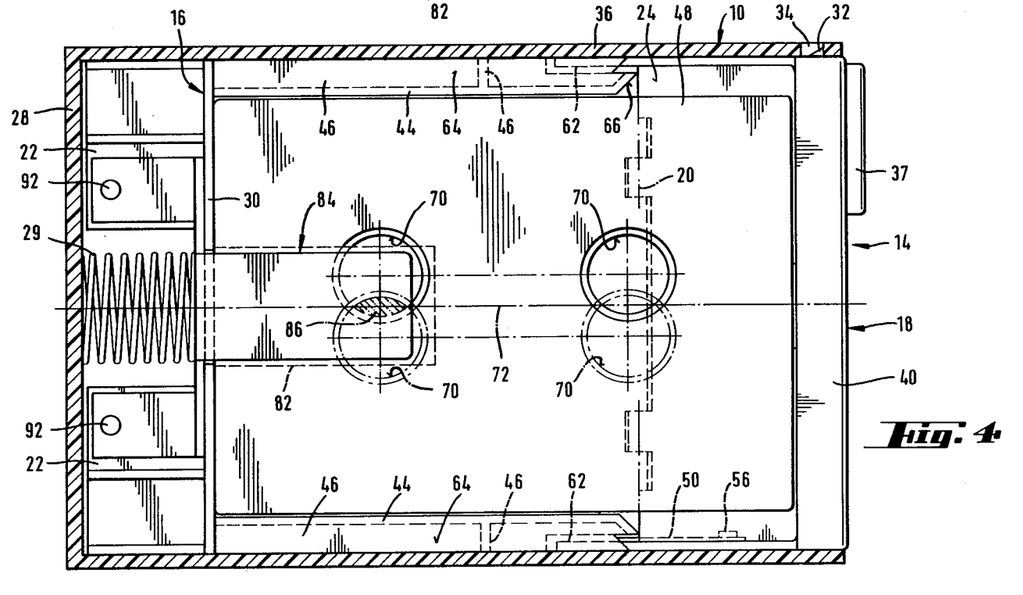
FIG. 4 shows similar to FIG. 2 a second embodiment when closed.
Figure 5:
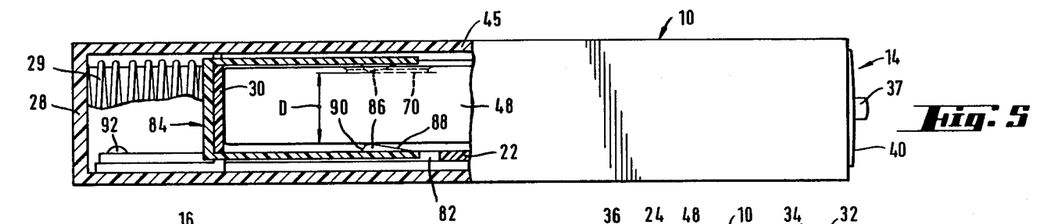
FIG. 5 is a section view of the bracket used in the latter embodiment.

The embodiment of FIG. 4 and 5 is similar to the first embodiment so that only design differences will be explained.

Sheet metal bracket 78 is replaced by a plastic material bracket 84 which has integrally molded arresting cams 86 which have a twinsegment shaped contour, indicated by the hatching in FIG. 4. Cams 86 have insertion chamfers 88 with a soft slope, and arresting chamfers 90 of steeper slope. It is important that the plastics material of the bracket is elastically deformed over short durations only because otherwise, it could become plastically deformed because of so-called "cold flux". For this reason, the distance spacing the arms between the arresting cams 86 is just equal to thickness "D", measured from the basic large face of the cassette to the bottom of the recess 70 on the opposite large face. In result, bracket 84 is expanded only during insertion or removal of a cassette. The position of a stored cassette is defined, as in the embodiment of FIG. 1-3, by the guide portion bottom and the inwardly protruding ribs 47 on housing top wall, bracket 84 is mounted commensurate with the height of one arresting cam. For this purpose, bottom 22 extends beyond rear wall 30, and bracket 84 is secured to this bottom extension by means of rivets 92 integrally formed with the slider guide portion. The lever arm so defined is sufficient to permit the slight pivoting movement explained above.

When dealing with the further embodiments, only substantial differences over the previously described embodiments will be discussed as the fundamental design of the containers is identical.

Figures 6, 8:
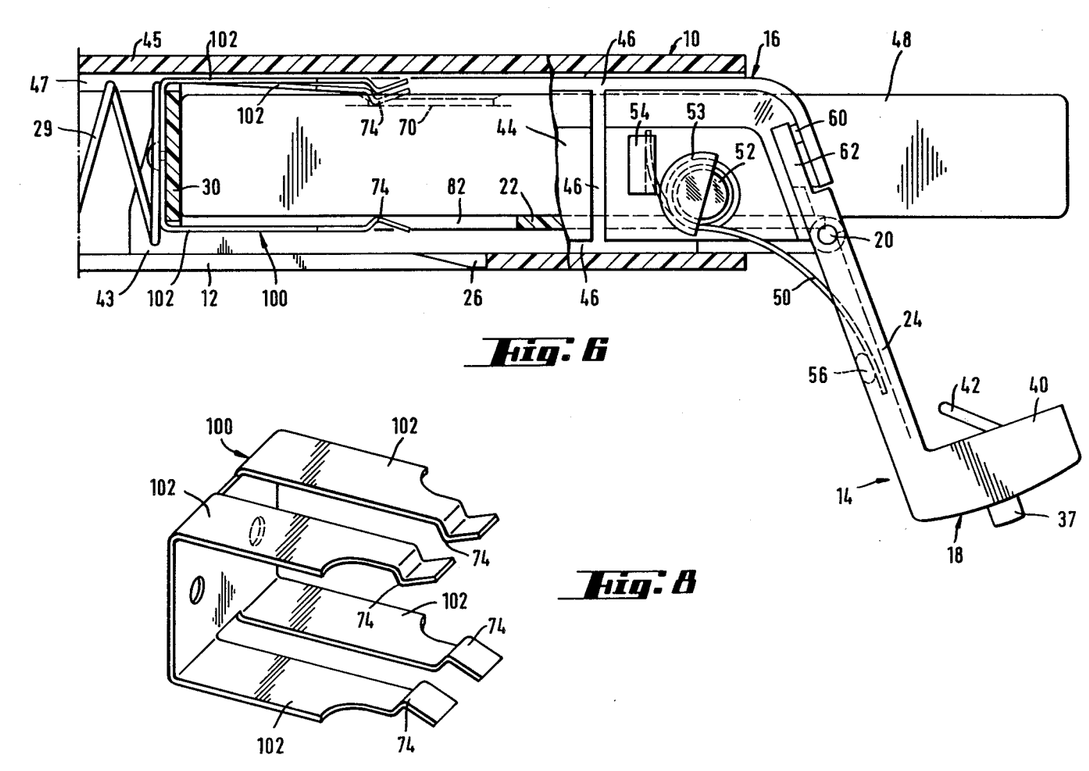
FIG. 6 illustrates in a manner similar to FIG. 1 a further embodiment.
FIG. 8 illustrates isometrically the arresting means of the latter embodiment.
Figure 7:
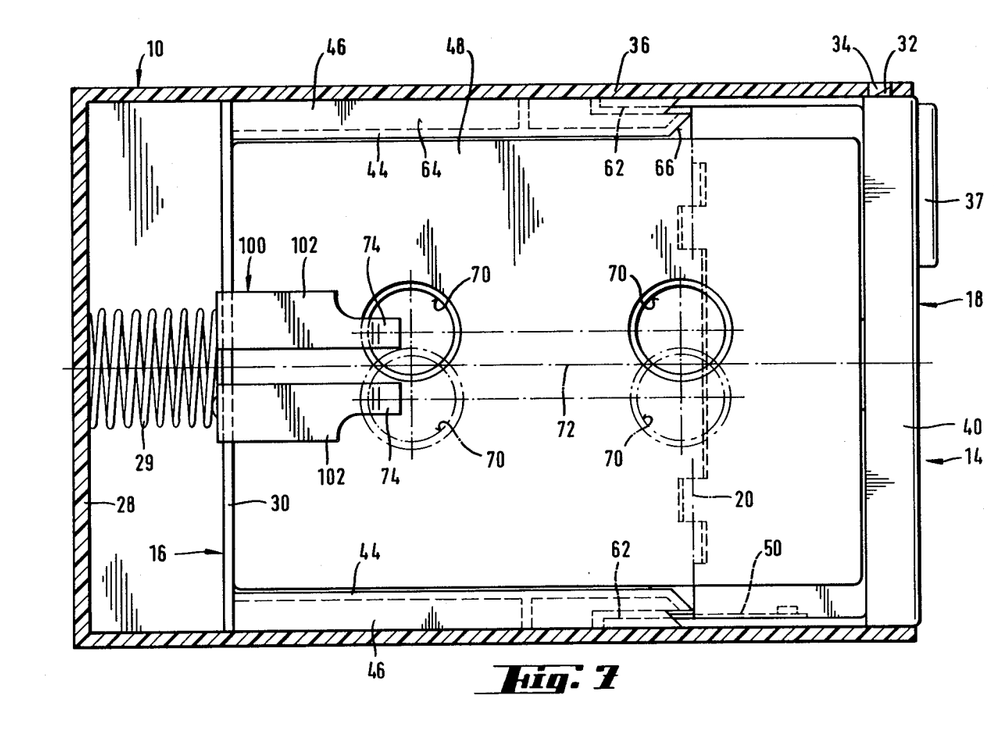
FIG. 7 is a section view transverse to that of FIG. 6 and illustrates the closed container.

In FIG. 6 through 8, a sheet metal bracket 100 is riveted to rear wall 30 of the slider. Bracket 100 inclues four arms 102 which are resiliently deflectable independent of eachother. Each arm has an angled cam adjacent its free end. In each possible orientation of a cassette 48, one of the four arms may engage a particular recess 70 so to latch the cassette to the slider.

Figure 9:
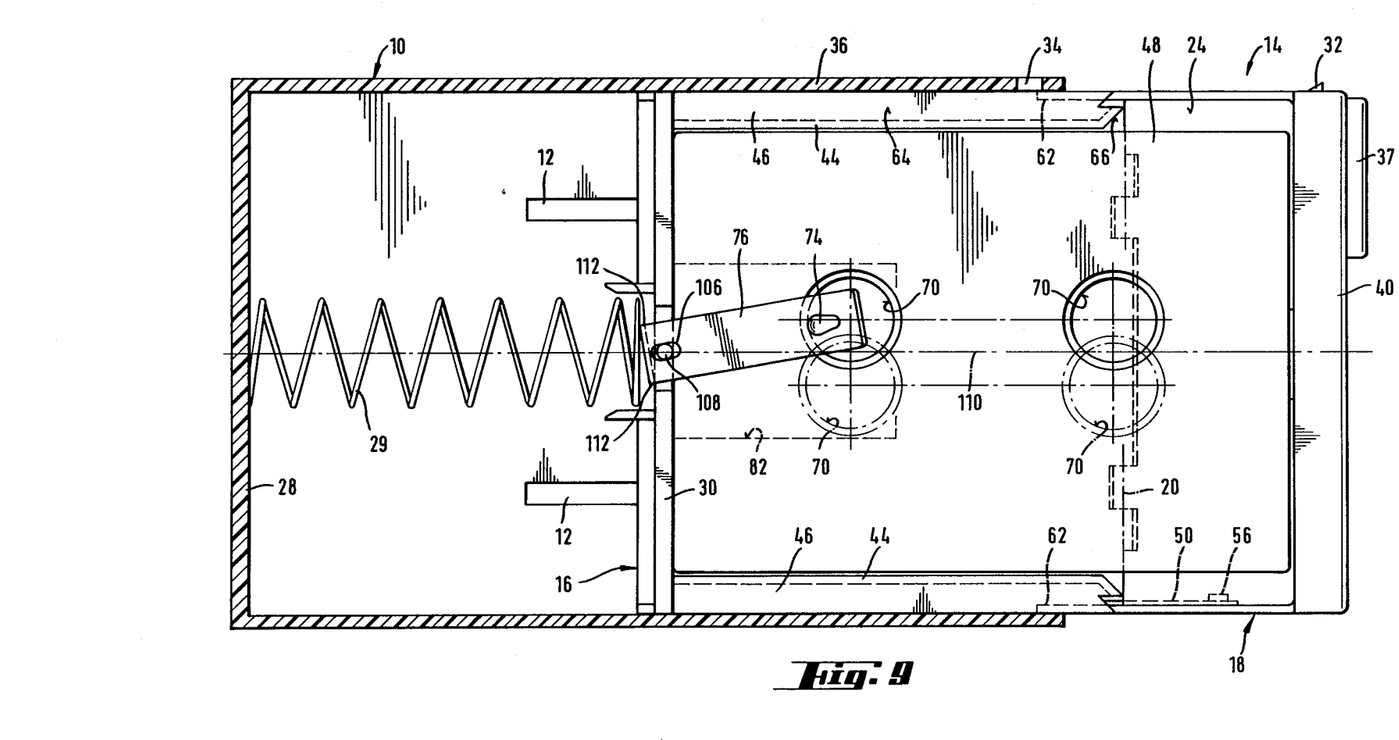
FIG. 9 shows in a manner similar to FIG. 2 a still further embodiment.
Figure 10:
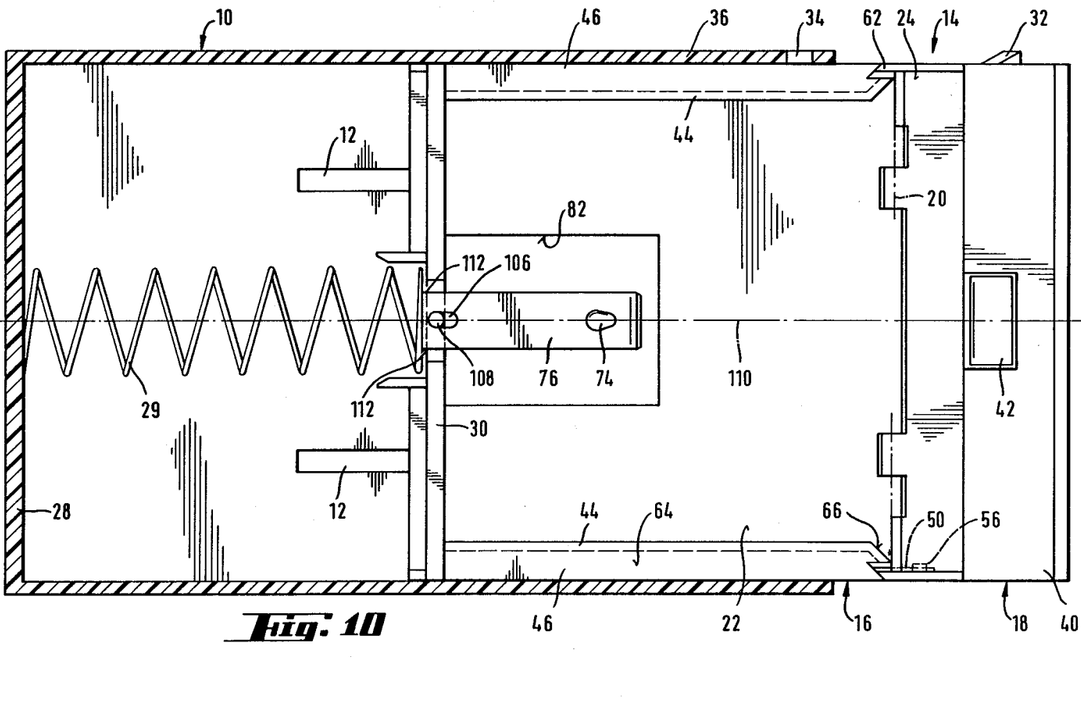
FIG. 10 illustrates the rest position of the arresting member of the latter embodiment.

The embodiment of FIG. 9 and 10 has a bracket similar to the one in FIG. 1. However, the bracket is not snap-fitted to rear wall 30 of the slider but has an elongated hole 106 which receives a pin 108 provided on rear wall 30. As long as there is no cassette in the container, ejection spring 29 urges upon the base portion of the bracket so to hold it in engagement with the rearwards facing side of wall 30. The bracket, therefore, assumes a "searching" position in the longitudinal central plane 110 of the slider (cf. FIG. 10). Upon insertion of a cassette, one of the cams 74 provided adjacent the free end of arm 76 will engage one of the recesses 70, and because of the wedge shape of the interengaging contact faces, a deflecting force transverse to the insertion direction of the cassette is transmitted to the bracket so that the latter assumes the position illustrated in FIG. 9. As the bracket tilts about one of the edges 112 of the bracket base portion, the cam is also displaced rearwards which is possible because of the elongated hole. The dimensions are choosen such that the cam 74 is in engagement with that area of recess 70 which is nearmost to the rear wall 30.

Figure 11:
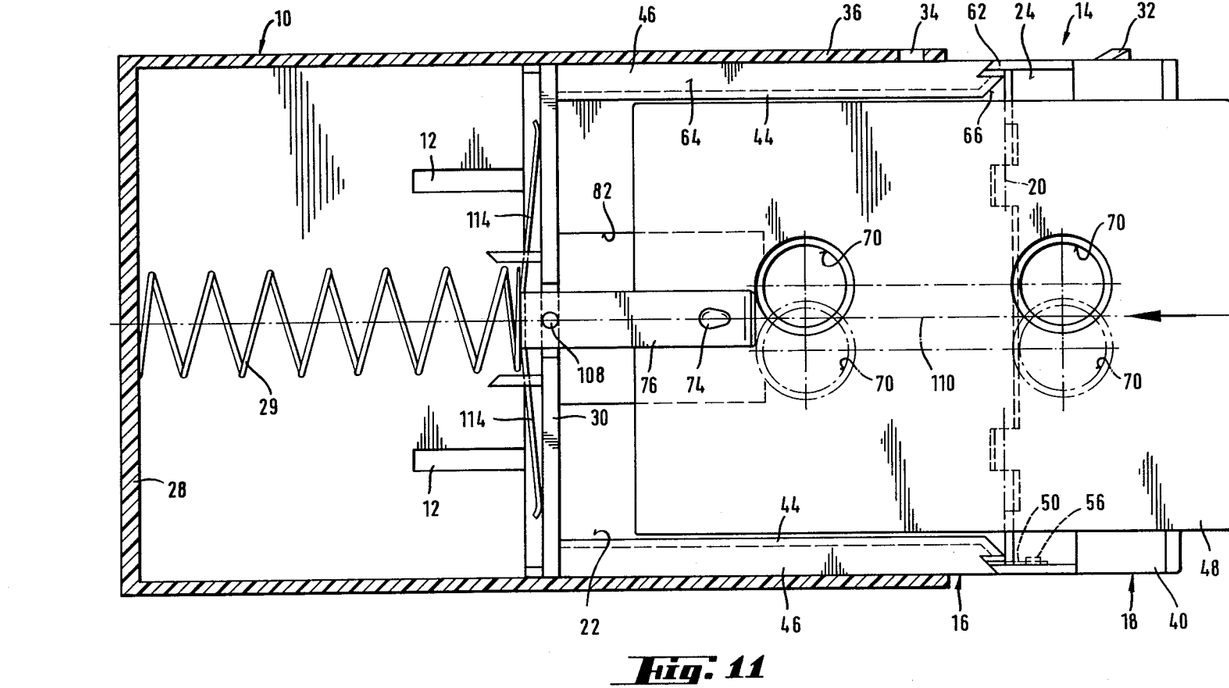
FIG. 11 illustrates schematically a still further embodiment.
Figures 12, 13:
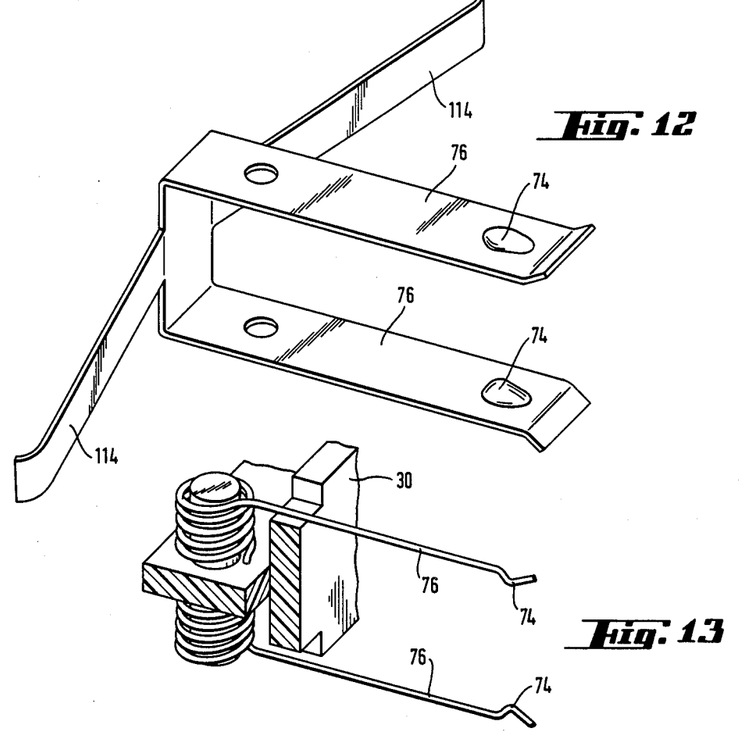
FIG. 12 shows the arresting members thereof.
FIG. 13 and 14 show respectively in an isometric view and in laterla view a further form of arresting members.

The arresting members of the embodiment of FIG. 11 and 12 operate in a similar manner. However, there is no elongated hole; instead, the reset springs which redisplace the bracket into its search position are integrally formed with the bracket as arms 114 thereof.

Figure 14:
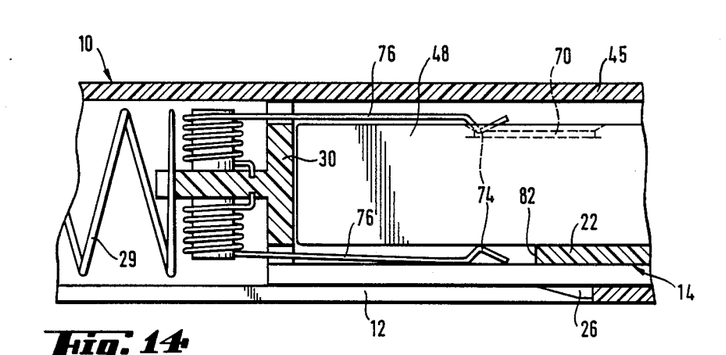

In the embodiment of FIG. 13 and 14, cams 74 are formed on wire springs 76 which may produce themselves the resetting forces into the search position.

Figure 15:
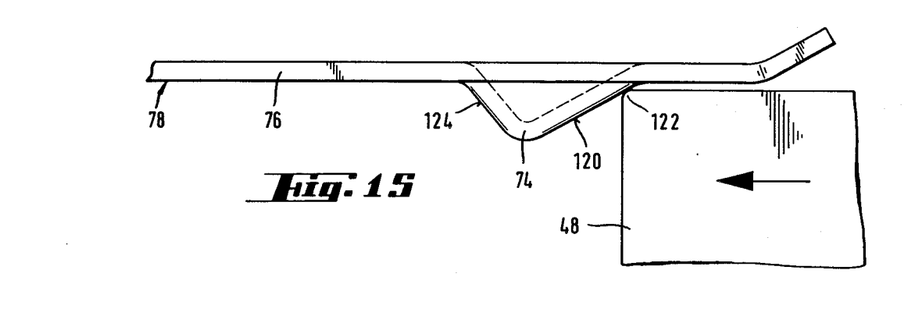
FIG. 15 and 16 show respectively two positions of the interaction between a cassette and the arresting members.
Figure 16:
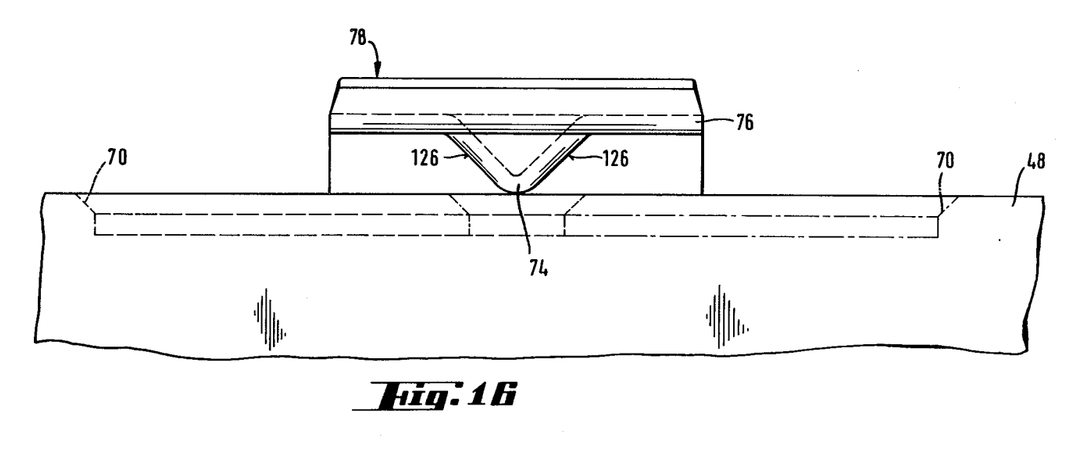

FIG. 15 illustrates in enlarged scale the profile of a cam 74, seen transverse to the cassette insertion direction. One will recognize the softly sloping wedge surface 120 which engages an edge 122 of the cassette, and a steeply sloped arresting surface 124. A similarly steep slope is also provided for the lateral faces of the cams seen in insertion direction, as illustrated in FIG. 16.

Figure 2:
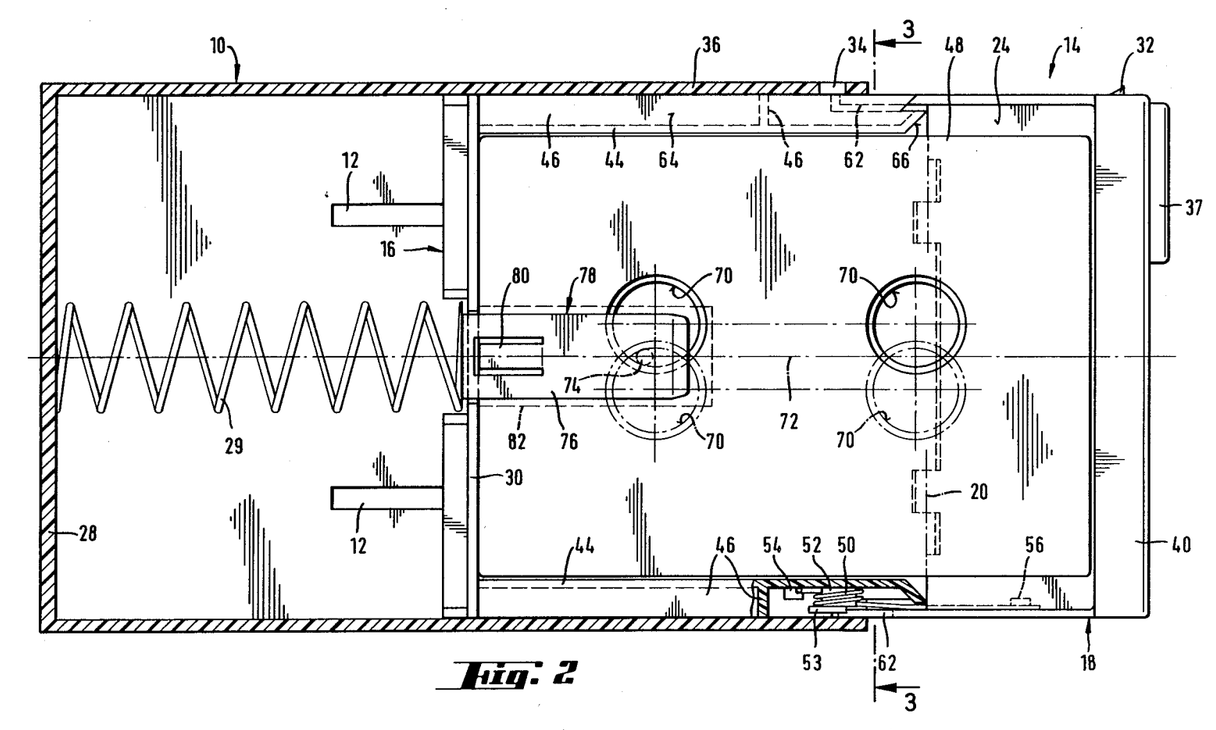
FIG. 2 is a transverse section view of the same container.
Figure 17:
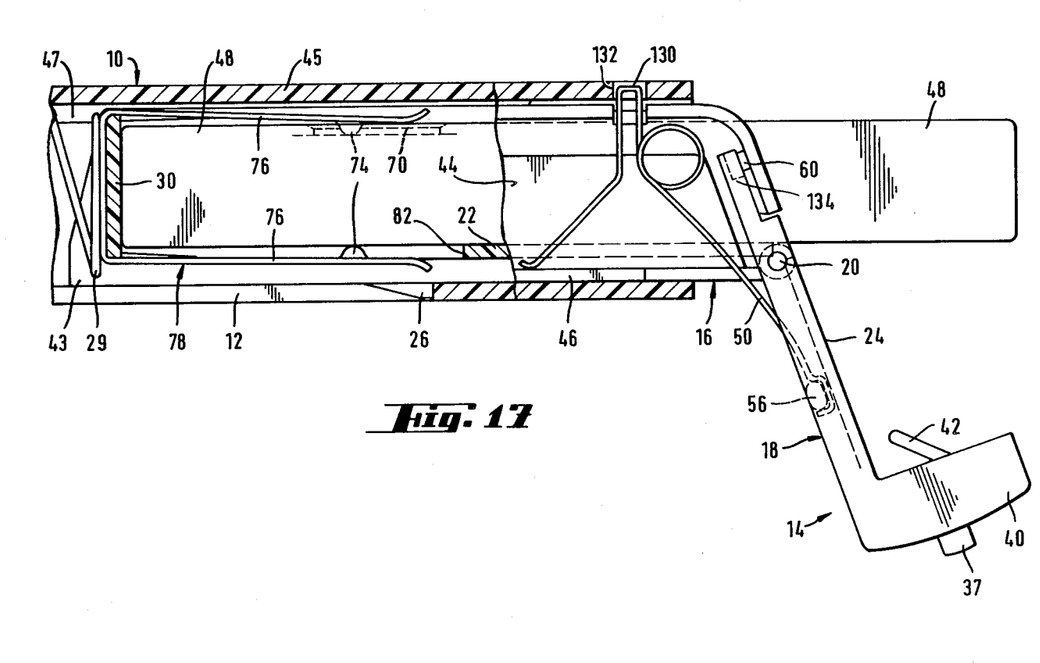
FIG. 17 shows in a manner similar to FIG. 1 a still further embodiment.

FIG. 17 shows an advantageous modification of the container of FIG. 1-3. Spring 50 has its coil not mounted on a pin but the coil is freely moveable within the the cavity between slider and housing. Further, the spring is provided with an extra loop 130 which, when the front wall assembly pivots away in the removal position, is displaced into an aperture 132 of the housing. Thus, the slider is latched in the removal position, and only after the loop having been withdrawn from the aperture upon pivoting-back of the front wall assembly whereby stop arm 134 hits the spring, the slider may be pushed back into the housing.

Figure 18:
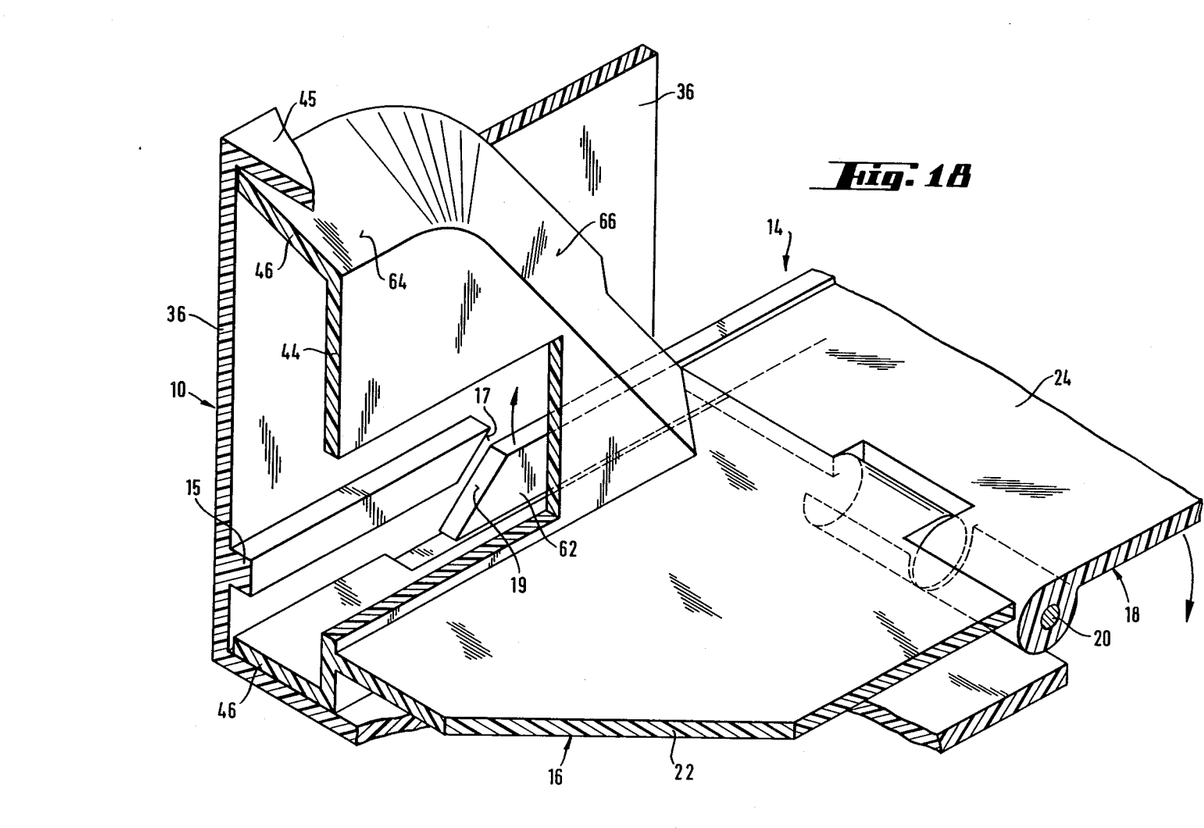
FIG. 18 is an isometric view, broken away, of a modification of the embodiments of FIG. 1 or 17.

FIG. 18 illustrates isometrically and broken away a detail which may be used in the embodiments of FIG. 1-3 or 17. The slider with its hinge formes a linkage system under bias of spring 50. This may negatively affect the frictional conditions during slider ejection, in particular in case of a soft spring 29 which, in turn, is desirable in view of a comfortable touch for the user. The frictional conditions may be improved, however, if the free end of lever arm 62 is guided beneath a rib 15 integrally formed with housing side wall 36 on one or on both sides of the slider. The rib terminates at a site where the lever arm is expected to flap freely upwards when the front wall assembly pivots downwards. An inlet chamfer 17 on rib 15 and a counter chamfer 19 on lever arms 62 prevent that arm 62 may hit the free end of the rib.

I claim:

1. A container for accomodation of magnetic tape cassettes which exhibit, on a large face thereof, two circular recesses of identical size, said recesses being offset with respect to a plane of symmetry by a distance less than the recess diameter, said container comprising a substantially brick-shaped housing which has an open narrow side, the container further comprising transporter means for displacing a cassette received in the housing from an inner storage position into an outer removal position in which a portion of said cassette extends beyond said open housing side by an amount sufficient to permit grasping of the cassette, wherein the container includes at least one arresting member adapted to engage, depending upon the insertion direction of the cassette, respectively into the one or the other of said recesses, said arresting member being deflectable in a direction transverse to said large face upon insertion or withdrawal of a cassette.

2. The container of claim 1 adapted to receive a cassette with said recesses one behind the other in direction of movement of said transporting means.

3. The container of claim 1 wherein said transporting means includes a slider guided in said housing.

4. The container of claim 1 wherein spring means for biasing said transporting means into said removal position, said spring means being operatively connected between said housing and said transporting means, and the container further including locking means for locking said transporting means in said housing against said bias, and wherein said locking means can be manually unlocked.

5. The container of claim 1 wherein said at least one arresting member is disposed symmetrically with respect to said plane of symmetry.

6. The apparatus of claim 1 including two arresting members, each one allocated to one of two parallel alrge cassette faces.

7. The container of claim 1 wherein said at least one arresting member has dimensions parallel to said large face commensurate with the size of recess segments extending beyond said plane of symmetry.

8. The container of claim 1 wherein said transporting means includes a rear wall opposite said open housing side, and said arresting member being adapted to position a cassette in engagement with said rear wall.

9. The container of claim 1 wherein said arresting member is disposed on said transporting means.

10. The container of claim 1 wherein said arresting member is substantially rigid in any direction parallel to said large cassette face.

11. The container of claim 1 wherein said arresting member is displaceable by a limited amount in a direction parallel to said large cassette face.

12. The container of claim 1 wherein said arresting member has a first chamfered surface hit by a cassette edge upon insertion of the cassette into the container.

13. The container of claim 1 including manually releasable means for latching said transporting means in said removal position.

14. The container of claim 1 wherein said housing has side walls extending from said open side, said transporting means having walls extending parallel to said housing side walls and engaged by an inserted cassette, and means for spacing said transporter means side walls from adjacent housing side walls so as to define hollow cavities.

15. The container of claim 1 including spacing means for defining a hollow space between an inserted cassette and inner housing faces, said hollow space being dimensioned to permit deflection of said at least one arresting member.

* * * * *